United States Patent [19]

Shingaki et al.

[11] Patent Number: 5,124,831

[45] Date of Patent: * Jun. 23, 1992

[54] METHOD AND DEVICE FOR DRIVING ELECTROOPTICAL LIGHT SHUTTER

[75] Inventors: Kouichi Shingaki; Itaru Saito; Ken Matsubara; Hirohisa Kitano; Tomohiko Masuda, all of Osaka, Japan

[73] Assignee: Minolta Camera Kabushiki Kaisha, Osaka, Japan

[*] Notice: The portion of the term of this patent subsequent to Jun. 12, 2007 has been disclaimed.

[21] Appl. No.: 446,318

[22] Filed: Dec. 5, 1989

Related U.S. Application Data

[62] Division of Ser. No. 228,280, Aug. 4, 1988, Pat. No. 4,932,761.

[30] Foreign Application Priority Data

Aug. 7, 1987 [JP] Japan .................. 62-198961
Aug. 31, 1987 [JP] Japan .................. 62-218450

[51] Int. Cl.⁵ .................. G02F 1/03; G02F 1/01
[52] U.S. Cl. .................. 359/245; 359/246; 359/249; 359/251; 359/254; 359/276
[58] Field of Search .......... 350/355, 356, 384, 387, 350/389, 392, 393, 374; 359/245, 249, 251, 254, 255, 276, 246

[56] References Cited

U.S. PATENT DOCUMENTS

| | | | |
|---|---|---|---|
| 3,492,492 | 1/1970 | Ballman et al. | 350/393 |
| 3,639,771 | 2/1972 | Borrelli et al. | 350/393 |
| 3,737,211 | 6/1973 | Cutchen et al. | 350/356 |
| 4,629,993 | 12/1986 | Bouvier et al. | 350/393 |
| 4,932,761 | 6/1990 | Shingaki et al. | 350/355 |

OTHER PUBLICATIONS

McCann et al., "A Versatile Electronic Light Shutter Composed of a High Speed Switching Circuit Coupled with a Lithium Niobate Pockel's Cell".

Primary Examiner—Eugene R. Laroche
Assistant Examiner—Evelyn A. Lester
Attorney, Agent, or Firm—Burns, Doane, Swecker & Mathis

[57] ABSTRACT

A method of and a device for driving a light shutter having an electrooptical effect to polarize an incident light by applying an electric field to the light shutter. When the light shutter is made activate, an excessive electric field in addition to a half-wave electric field which is a specific one to polarize an incident light at 90° in the static characteristics of the light shutter is applied to the light shutter initially, and subsequently, the half-wave electric field only is applied to the light shutter. To discharge the electric charge accumulated in the light shutter, no voltage is applied to electrodes each of which is provided on the wall of the light shutter so as to oppose each other subsequent to the application of the electric field until the next application thereof.

10 Claims, 14 Drawing Sheets

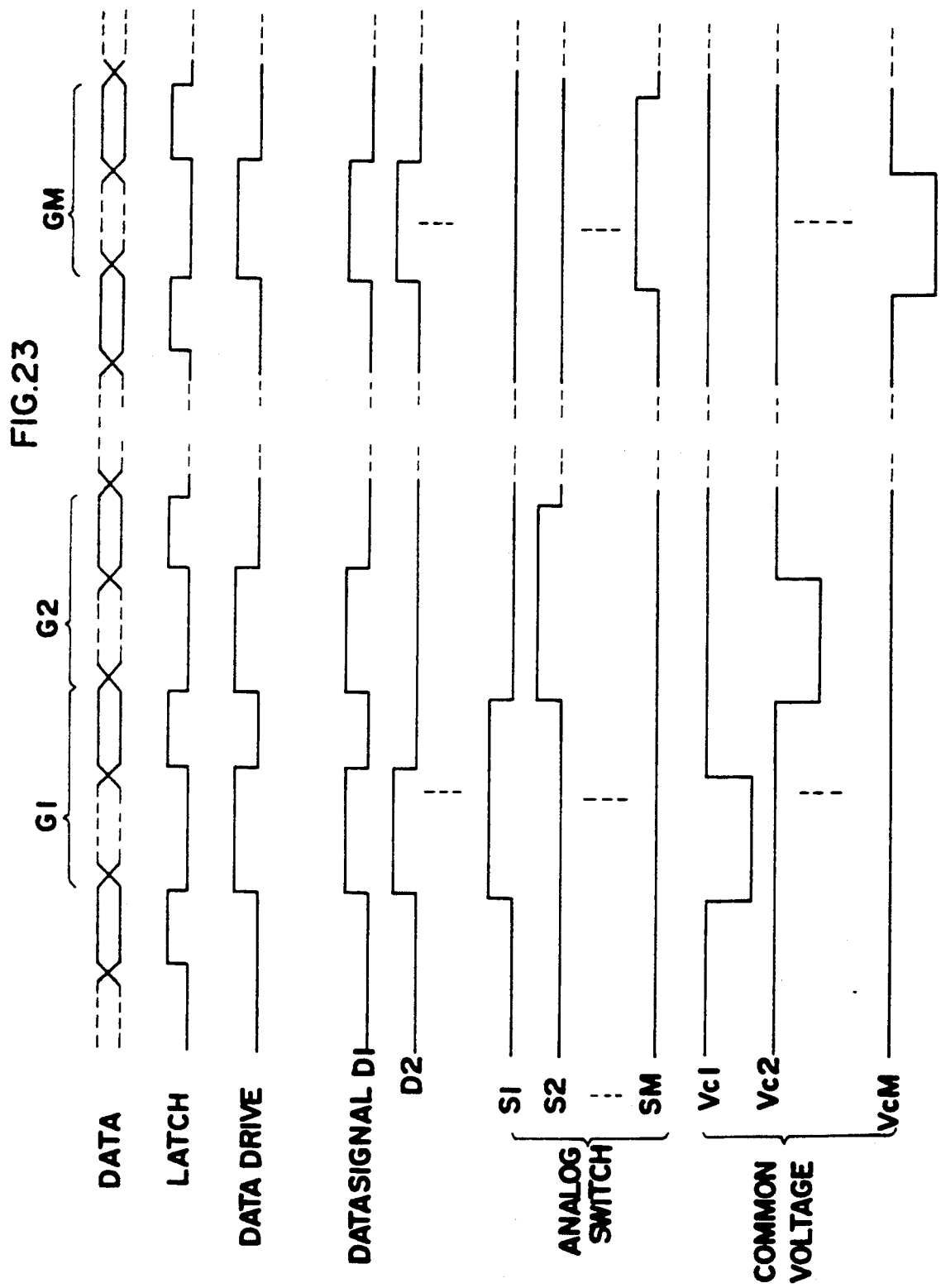

5,124,831

METHOD AND DEVICE FOR DRIVING ELECTROOPTICAL LIGHT SHUTTER

The application is a divisional of application Ser. No. 228,280 filed Aug. 4, 1988, now U.S. Pat. No. 4,932,761 issued Jun. 12, 1990.

FIELD OF THE INVENTION

The present invention relates to a method of and a device for driving a light shutter employing a material, such as PLZT, having an electrooptical effect, by applying an electric field to the shutter.

BACKGROUND OF THE INVENTION

Light shutters prepared from PLZT or like material having an electrooptical effect are driven usually by the arrangement shown in FIG. 1. The illustrated light shutter 1 has electrodes 2 and 3 at its opposite sides. With the electrode 2 grounded, a pulse voltage of suitable intensity is applied to the other electrode 3 as a drive voltage Vd1, whereby light incident on the light shutter 1 through a polarizer 4 is polarized within the shutter 1 to pass through an analyzer 5. The light is modulated depending on whether the drive voltage Vd1 is thus applied to the shutter 1.

FIG. 2 shows the relationship between the voltage applied to the light shutter of FIG. 1 and the intensity of light transmitted through the analyzer. With such light shutters, it is known that the intensity of transmitted light reaches a maximum level when a specific voltage is applied at which the angle of polarization of the light within the shutter matches the analyzer in the static characteristics, that is, usually when a half-wave voltage $V\lambda/2$ specific to the shutter 1 is applied to polarize the light at 90°.

To drive the light shutter 1, therefore, the half-wave voltage $V\lambda/2$ is conventionally applied to the other electrode 3.

In the case where the light shutter is used in electrophotographic printers or the like, the shutter must be driven with pulses in conformity with the speed of rotation of the photosensitive drum for forming images thereon. However, if it is attempted to drive the shutter with the half-wave voltage $V\lambda/2$ in the form of pulses to give transmitted light of maximum intensity, there arises the problem that the photosensitive drum can not be fully exposed to light and produces only a poor contrast if the pulses are of short duration. For a full exposure of the photosensitive drum, the half-wave voltage $V\lambda/2$ needs to be applied to the shutter in pulses of increased duration or width, but this entails the problem of greatly reducing the system speed of the printer or the like and failing to realize a high-speed operation.

On the other hand, when an array of a multiplicity of such light shutters arranged in a line is used, for example, as the writing head of an electrophotographic apparatus including a photosensitive member, with half-wave voltage $V\lambda/2$ applied to one of the electrodes of one shutter to drive the shutter, the voltage applied to the electrode is high, so that a current is likely to flow through another light shutter which is not driven, permitting light to leak through the undriven shutter to impair the contrast of the image obtained.

To overcome this problem, accordingly, we conceived utilization of the characteristics of the light shutter that with reference to the characteristics curve of FIG. 2, there is little or no transmitted light until the voltage applied to the light shutter reaches a definite level V1. For example, when the light shutter is 60 $\mu$m in the distance between the electrodes at its opposite sides and 120 $\mu$m in the length of its optical path and is driven with a half-wave voltage $V\lambda/2$ of about 50 V, there is substantially no transmitted light until the voltage reaches about 20 V. More specifically, we prepared the arrangement of FIG. 3 wherein a bias voltage Vb of up to the level V1 for giving no transmitted light was always applied negatively to the electrode 2 to be grounded, while a drive voltage Vd2, which was lower than the half-wave voltage $V\lambda/2$ by an amount corresponding to the bias voltage Vb, was applied to the other electrode 3 to drive the light shutter 1.

The potential difference across the electrodes 2, 3 at the opposite sides of this shutter 1 is the same as in the foregoing case wherein the half-wave voltage $V\lambda/2$ is applied to one of the electrodes, such that the light shutter 1 is subjected to an electric field of the same intensity as above and affords transmitted light of the same intensity while the drive voltage Vd2 to be applied to the electrode 3 can be lower.

Nevertheless, we have found that in the case where the light shutter is thus driven, leakage of light still occurs even if the shutter is off as shown in FIG. 4.

SUMMARY OF THE INVENTION

Accordingly, the main object of the present invention is to provide a method of and a device for satisfactorily driving a light shutter in accordance with the characteristics of the shutter.

Another object of the invention is to provide a method of and a device for driving a light shutter having an improved speed of response so as to give a desired quantity of light within a shortened period of time.

Still another object of the invention is to provide a method of and a device for driving a light shutter with a lower drive voltage free of leakage of light.

To fulfill the above objects, the present invention is characterized by applying to a light shutter an excessive electric field in addition to a half-wave electric field only initially when driving the shutter and subsequently applying the half-wave electric field only to the shutter.

The invention is further characterized by applying voltages of different polarities to the respective electrodes of a light shutter to drive the shutter and thereafter discharging the charge accumulated in the shutter with the applied voltages.

BRIEF DESCRIPTION OF THE DRAWINGS

These and other objects or features of the present invention will become apparent from the following description of preferred embodiments thereof taken in conjunction with the accompanying drawings, in which:

FIGS. 13 (b) and 14 (b) are electric circuit diagrams showing the respective drive devices for applying the voltages of FIGS. 13 (a) and 14 (a) to the light shutter;

FIG. 23 is a timing chart of the circuit of FIG. 22.

In the following description, like parts are designated by like reference numbers throughout the several drawings.

DESCRIPTION OF THE PREFERRED EMBODIMENTS

First and second embodiments of the invention will be described below.

Figure 1:
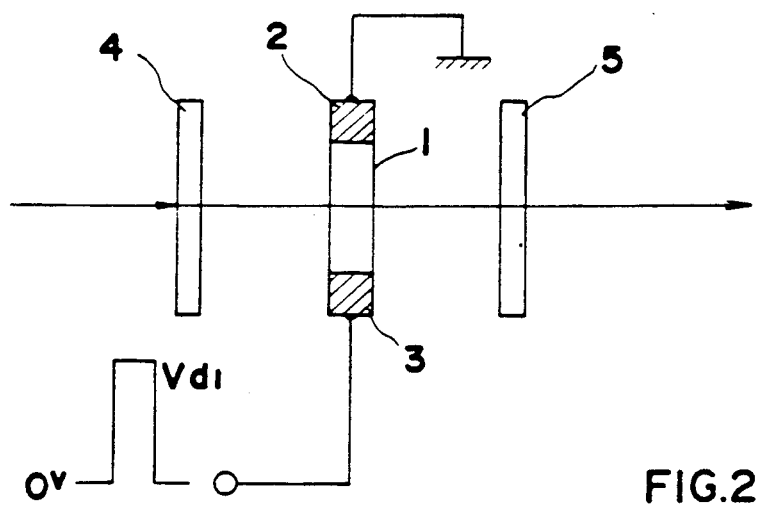
FIG. 1 is a diagram showing a common method of driving a light shutter.
Figure 5:
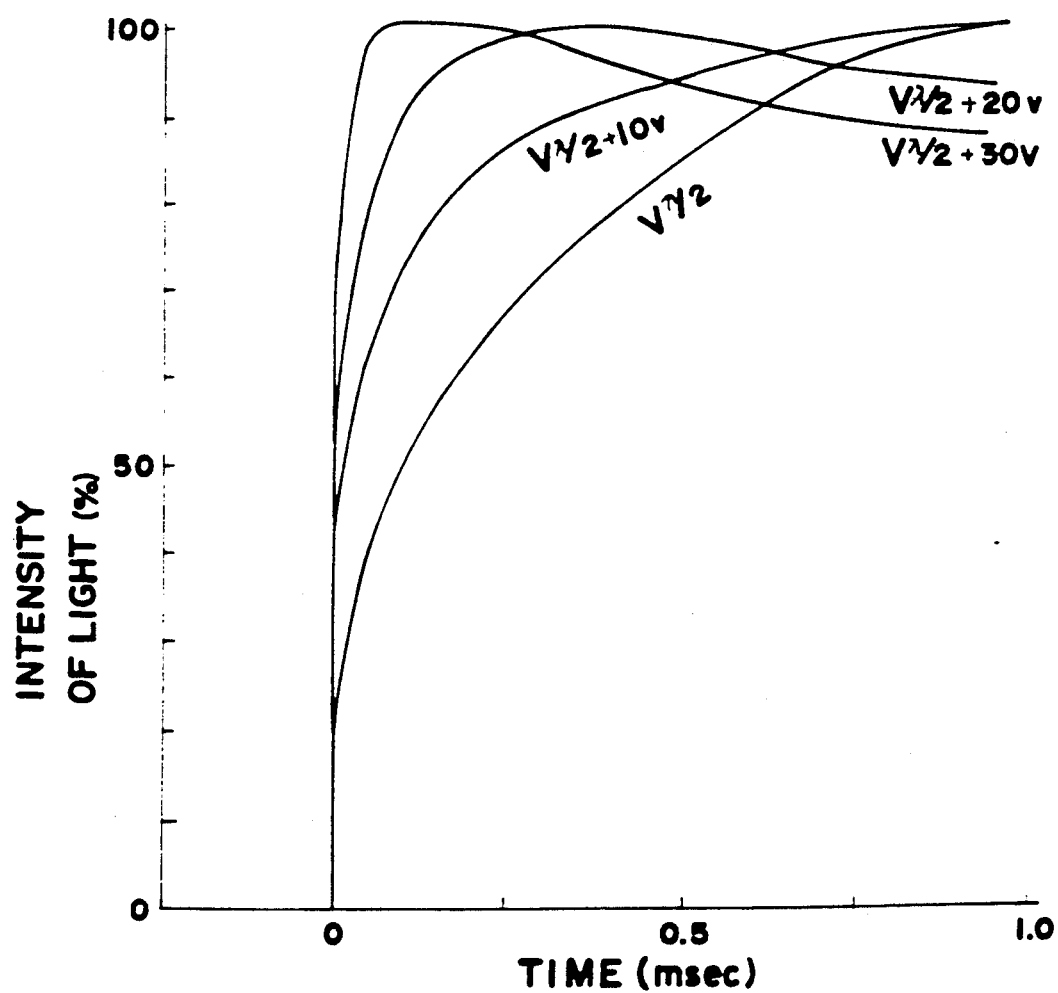
FIG. 5 is a characteristics diagram showing variations in the intensity of transmitted light when a half-wave voltage Vλ/2, or the voltage Vλ/2 plus an excessive voltage Vx is applied to the light shutter.

The principle of the first embodiment will be described first. FIG. 5 shows variations in the intensity of transmitted light with time when a half-wave voltage Vλ/2, or the half-wave voltage Vλ/2 plus an excessive voltage Vx is applied to the same light shutter as shown in FIG. 1, the excessive voltage Vx being 10 V, 20 V or 30 V. Plotted as ordinate in FIG. 5 is the intensity of transmitted light (%) relative to the eventual intensity of transmitted light (peak in FIG. 2), taken as 100, due to the half-wave electric field Eλ/2, vs. the time (msec) plotted as abscissa. The diagram reveals that the higher the excessive voltage Vx applied, the more rapid is the rise of the light intensity and the higher is the speed of response, further indicating that the light intensity gradually decreases with time as the voltage Vx increases.

Figure 6A:
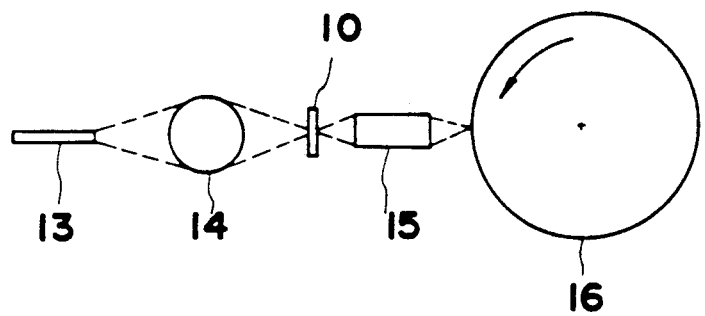
FIGS. 6 (a) and (b) are a side elevation and a plan view, respectively, schematically showing an electrophotographic printer incorporating a light shutter.
Figure 6B:
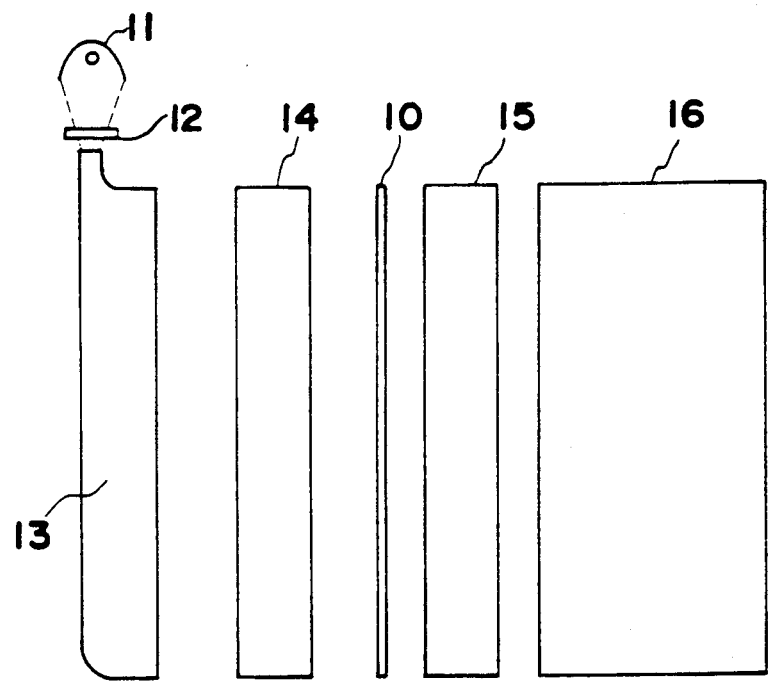

Next, FIGS. 6 (a) and (b) show an array of light shutters like the one shown in FIG. 1 and aligned, as incorporated in an electrophotographic printer. The light from a halogen lamp 11 is led through a heat absorbing filter 12 to a light guide 13, from which the light is incident on a rod lens 14. The light through the lens 14 is concentrated on the light shutter array 10, in which an electric field of required pulse width is applied to the light shutter element at an appropriate position to transmit the light therethrough. The light passing through the light shutter element is collimated with an array of rod lenses, 15, in the form of a bundle of optical fibers and then projected onto a photosensitive drum 16 to form a dot on the drum 16.

Figure 7:
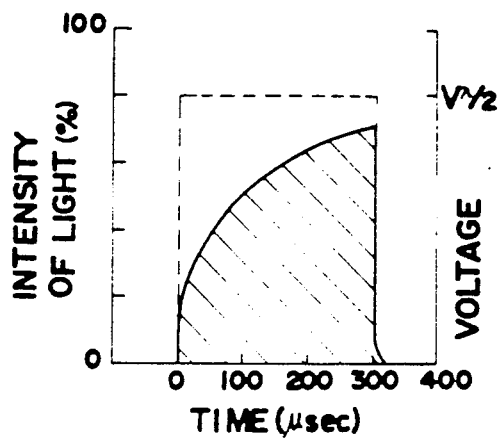
FIGS. 7 to 10 are diagrams showing variations in the intensity of transmitted light when the respective different voltages used for FIG. 5 are applied to the light shutter with a pulse width of 300 μsec.
Figure 8:
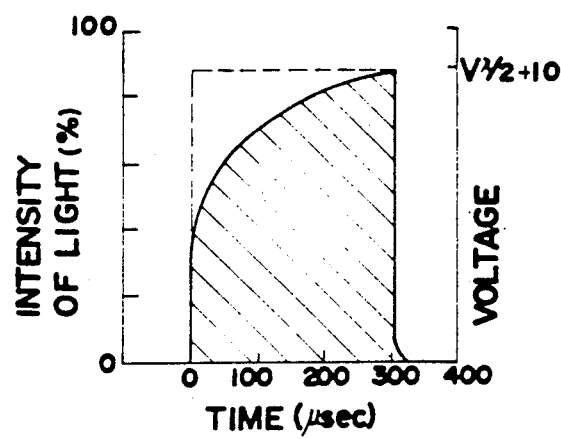
Figure 9:
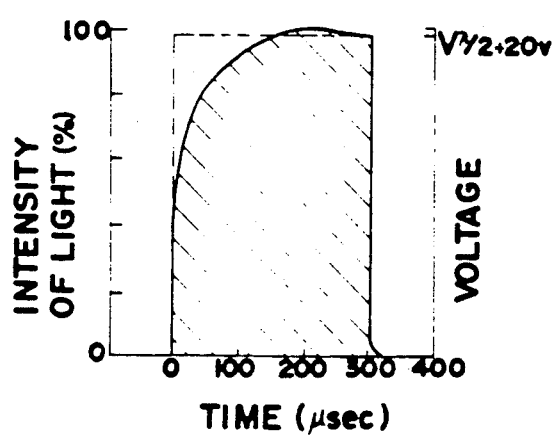
Figure 10:
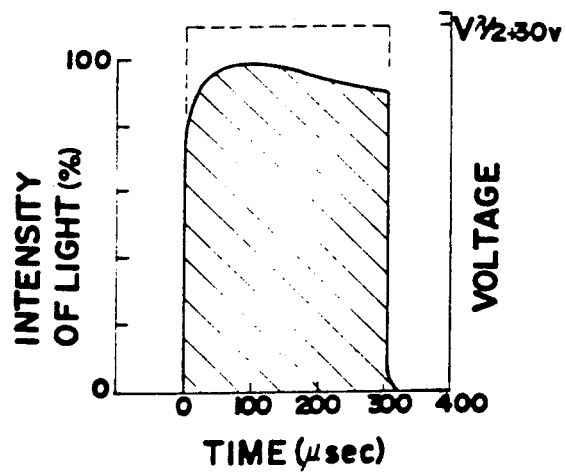

The period of time during which the light is on for forming the dot is up to hundreds of microseconds if longest, and this period decreases as the system speed of the electrophotographic printer increases. FIGS. 7 to 10 show variations in the intensity of transmitted light when the same respective voltages as in the case of FIG. 5 are applied to the light shutter with a pulse width of 300 μsec, on the assumption that the on period is 300 μsec. FIG. 7 shows such variations at the voltage of Vλ/2. FIG. 8 at the voltage of Vλ/2+10 V, FIG. 9 at the voltage of Vλ/2+20 V, and FIG. 10 at the voltage of Vλ/2+30 V. Plotted as ordinate in these diagrams are the drive voltage and the intensity of transmitted light (%) relative to the eventual intensity of transmitted light, taken as 100, due to the half-wave voltage Vλ/2, vs. the time (μsec) as abscissa. The pulse of the drive voltage is indicated in broken line. The hatched portion in each diagram represents a cumulative quantity of transmitted light.

Consequently, in the case where the on period is 300 μsec, the application of a voltage approximate to Vλ/2+20 V results in the greatest cumulative quantity of transmitted light. Thus, this voltage, when applied to the light shutter, effectively exposes the photosensitive drum to light.

When the light shutter array is driven with a pulse width of 100 μsec, it is desirable to use a drive voltage of Vλ/2+30 V or higher. Thus, a suitable excessive voltage Vx is used additionally in accordance with the light-on period for forming dots.

As the electric field applied to the light shutter increases in intensity beyond the half-wave electric field Eλ/2 set up by the half-wave voltage Vλ/2, the rise of the intensity of transmitted light is expedited, hence a higher speed of response, while the intensity raised remains stable when the shutter is thereafter driven with the half-wave voltage Vλ/2. Accordingly, this mode of voltage application is utilized for the first embodiment. Stated more specifically with reference to FIG. 11, the half-wave electric field Eλ/2 plus an excessive electric field Ex as superposed thereon is applied to the light shutter only initially when driving the shutter for the rise of the intensity of transmitted light, and the shutter is thereafter driven with the half-wave electric field Eλ/2 only without applying the excessive field. The light intensity then rises rapidly and thereafter remains stable as seen in FIG. 12 to give a maximum cumulative quantity of transmitted light regardless of the light-on period. For reference, the broken line in the same diagram represents variations in the intensity of transmitted light when the light shutter is driven only with the half-wave electric field $E\lambda/2$.

Figure 13A:
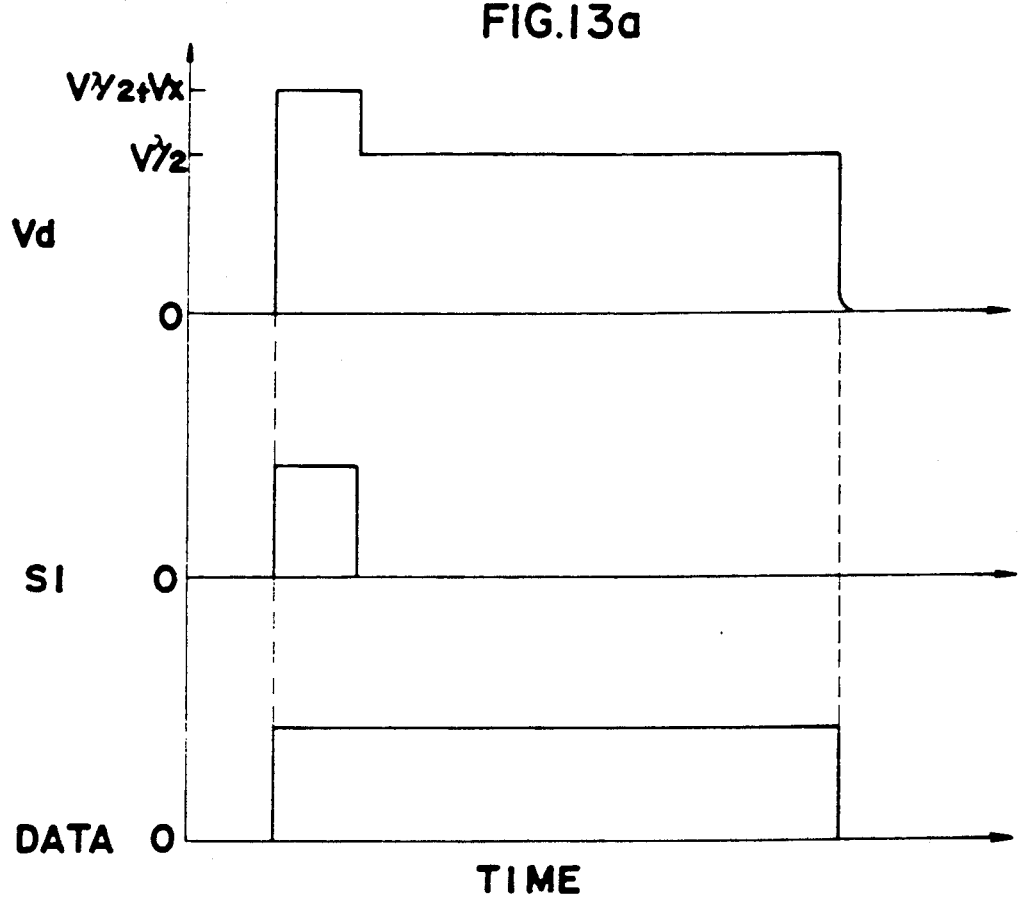
FIGS. 13 (a) and 14 (a) are diagrams showing the state of voltages applied to the light shutter according to the first embodiment.
Figure 13B:
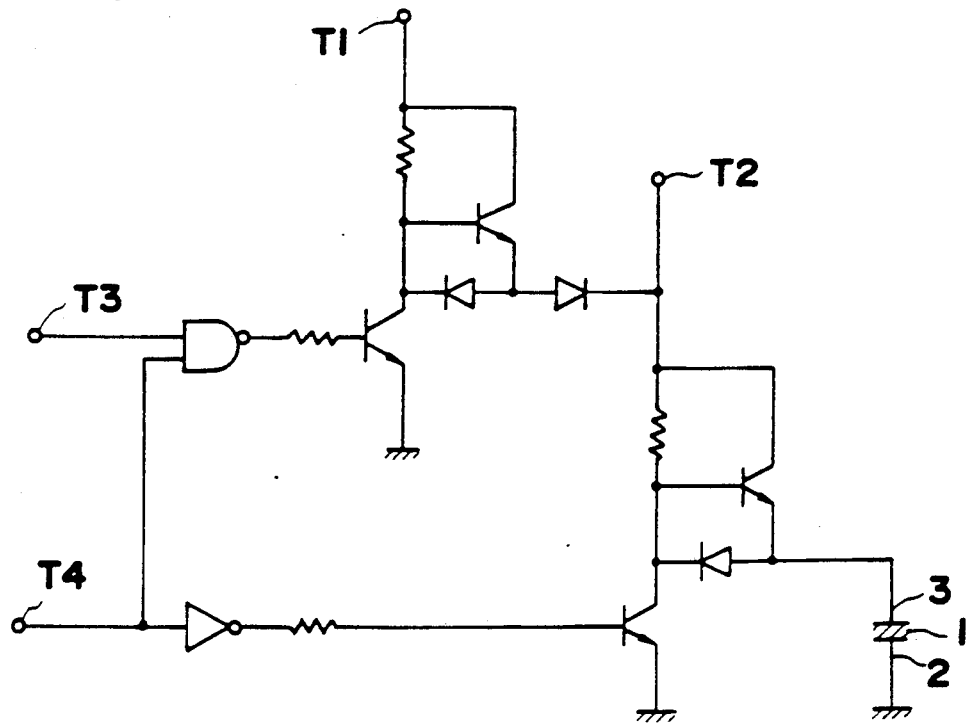

The light shutter can be driven in this mode by applying thereto a drive voltage Vd which is the half-wave voltage $V\lambda/2$ plus the excessive voltage Vx superposed thereon, only when raising the light intensity as shown in FIG. 13 (a). FIG. 13 (b) is an electric circuit diagram showing an example of drive device for this purpose. With reference to FIG. 13 (b), the voltage $V\lambda/2+Vx$ is applied to a terminal T1, and the voltage $V\lambda/2$ to a terminal T2. A periodic pulse signal S1 is applied to a terminal T3. In synchronism with this pulse signal S1, data for turning on and off the light shutter 1 is fed to a terminal T4. In the case where data for turning on the shutter 1 is fed, the voltage $V\lambda/2+Vx$ is applied to one of the electrodes, 3, of the shutter 1 only during the duration of a pulse of the signal S1 initially, and the voltage $V\lambda/2$ is applied during the subsequent on periods. The other electrode 2 of the shutter 1 is grounded.

Figure 11:
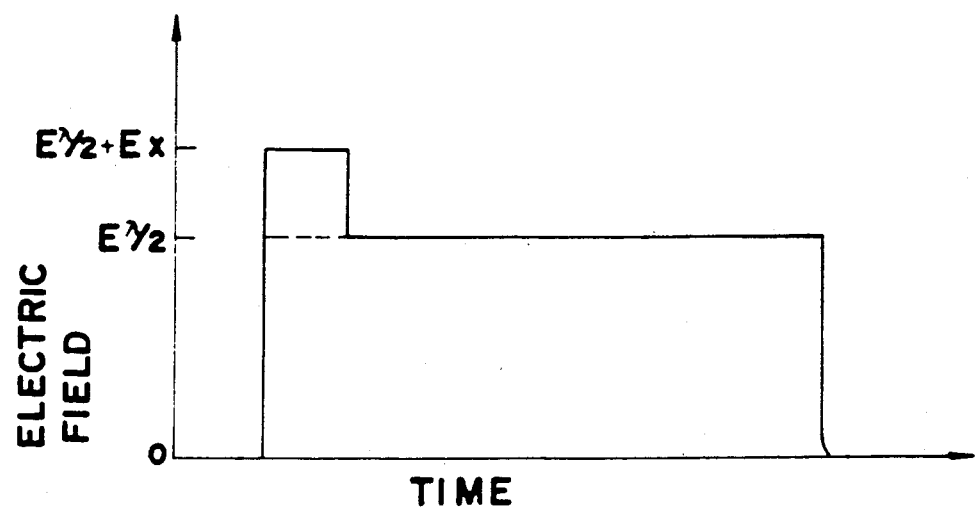
FIG. 11 is a diagram showing the state of an electric field applied to a light shutter according to a first embodiment of the invention.
Figure 12:
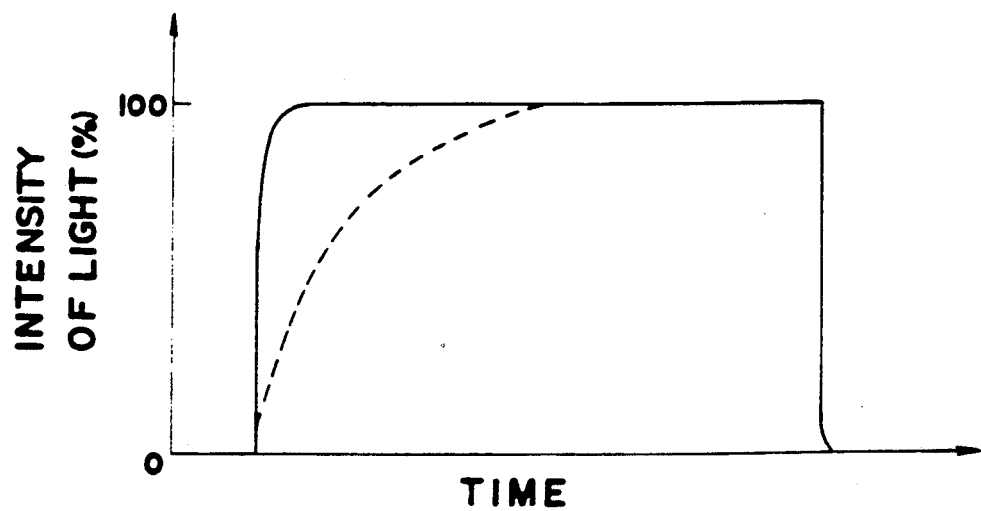
FIG. 12 is a diagram showing the intensity of light transmitted through the light shutter when the electric field of FIG. 11 is applied thereto.
Figure 14A:
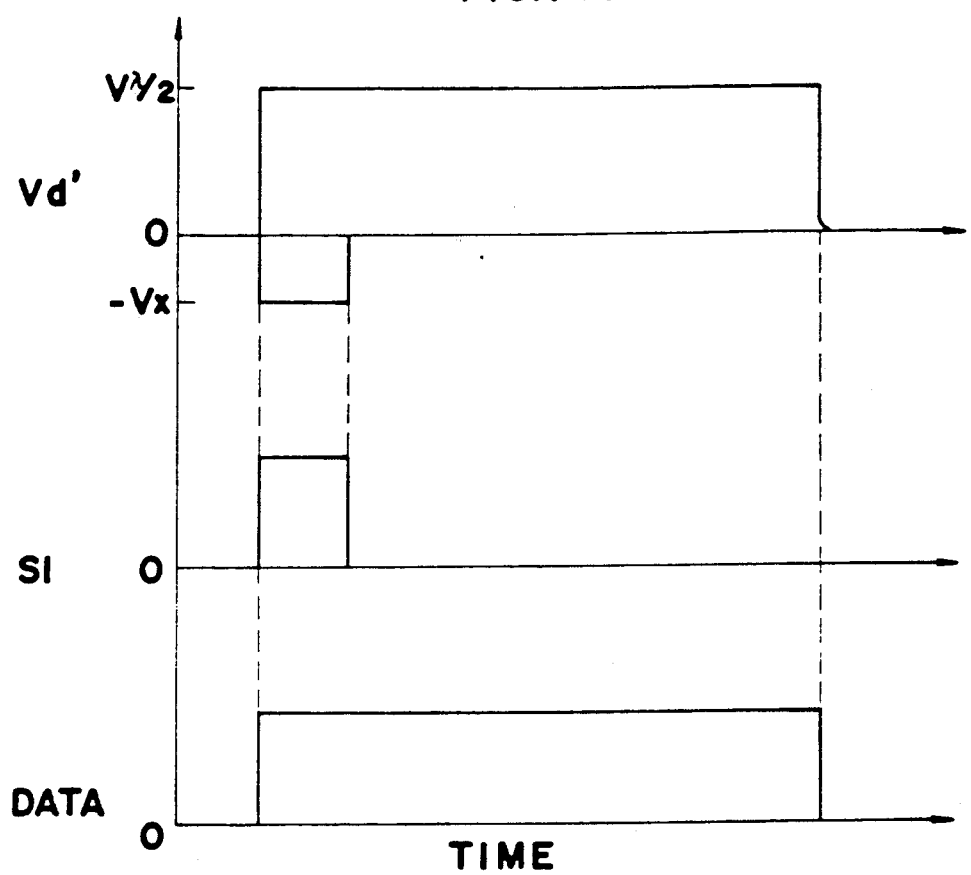
Figure 14B:
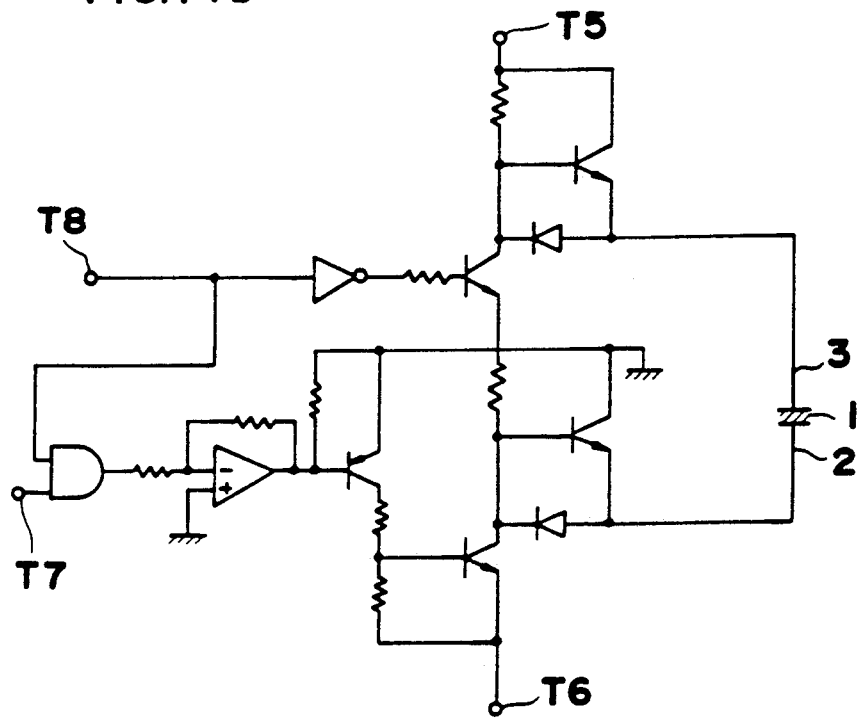

Alternatively, the light shutter may be driven with an electric field like the one shown in FIG. 11 by applying a voltage Vd' shown in FIG. 14 (a). In this case, the half-wave voltage $V\lambda/2$ is applied to one electrode, and an excessive voltage $-Vx$ of opposite polarity is applied to the other electrode only initially. FIG. 14 (b) is an electric circuit diagram showing a drive device for use in this case. With reference to this diagram, the half-wave voltage $V\lambda/2$ is applied to a terminal T5, and the excessive voltage $-Vx$ to a terminal T6. A pulse signal S1 and data like those described with reference to FIGS. 13 (a) and (b) are fed to terminals T7 and T8, respectively. Accordingly, when data for turning on the light shutter 1 is fed, the voltage $V\lambda/2$ is applied to one electrode 3 of the shutter 1, and the voltage $-Vx$ to the other electrode 2 initially, subjecting the shutter 1 to an electric field $E\lambda/2+Ex$. When the pulse signal S1 thereafter falls, the voltage $V\lambda/2$ only is applied to the shutter for an electric field $E\lambda/2$ to act thereon.

The drive method and device of the first embodiment described above greatly improve the light shutter in speed of response to afford a desired quantity of transmitted light within a shortened period of time.

The second embodiment of the invention will be described next.

Figure 3:
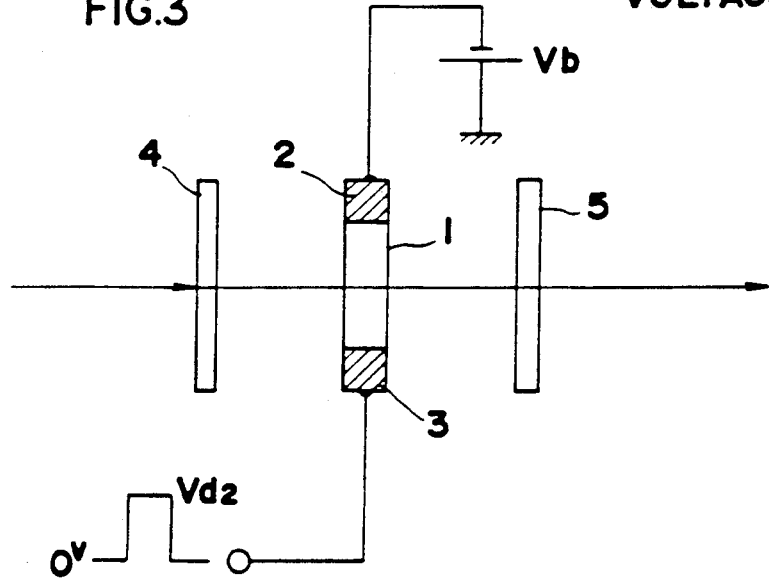
FIG. 3 is a diagram showing a method of driving a light shutter by applying a negative bias voltage to one of the electrodes for the shutter.
Figure 4:
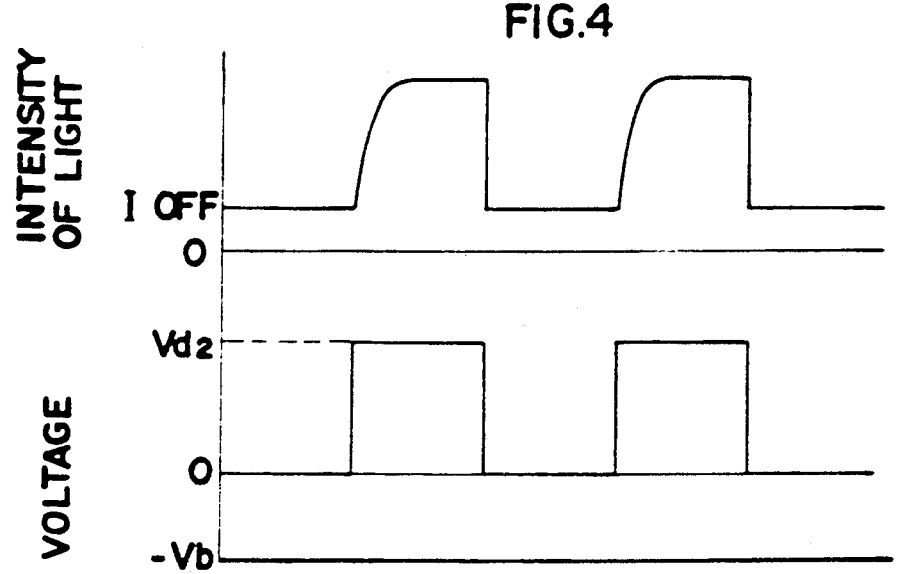
FIG. 4 is a diagram showing the relationship between the voltage applied to the light shutter and the intensity of transmitted light when the shutter is driven by the method of FIG. 3.
Figure 15:
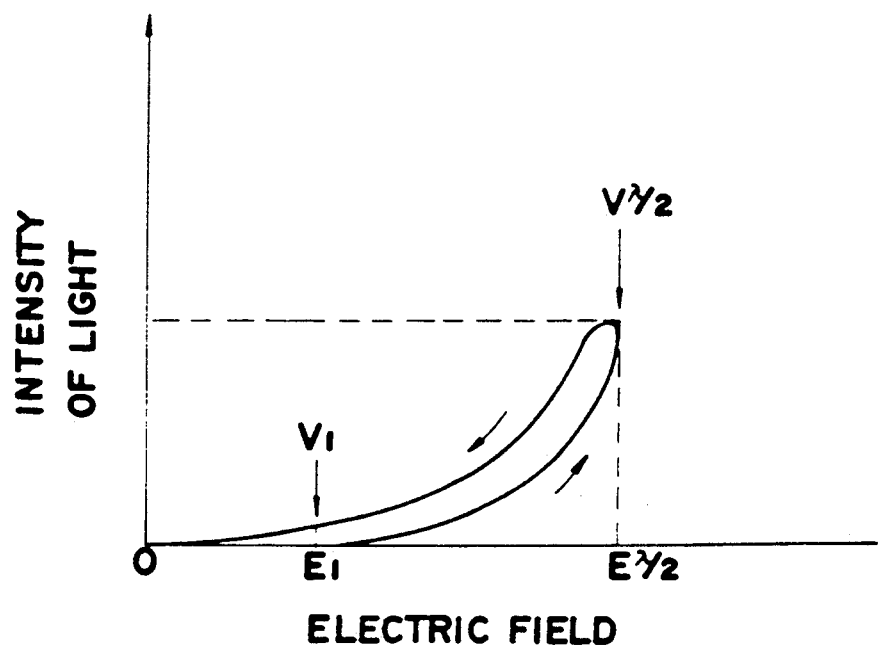
FIG. 15 is a characteristics diagram showing variations in the intensity of transmitted light when the light shutter of FIG. 1 is subjected to an electric field, followed by discharging.
Figure 16:
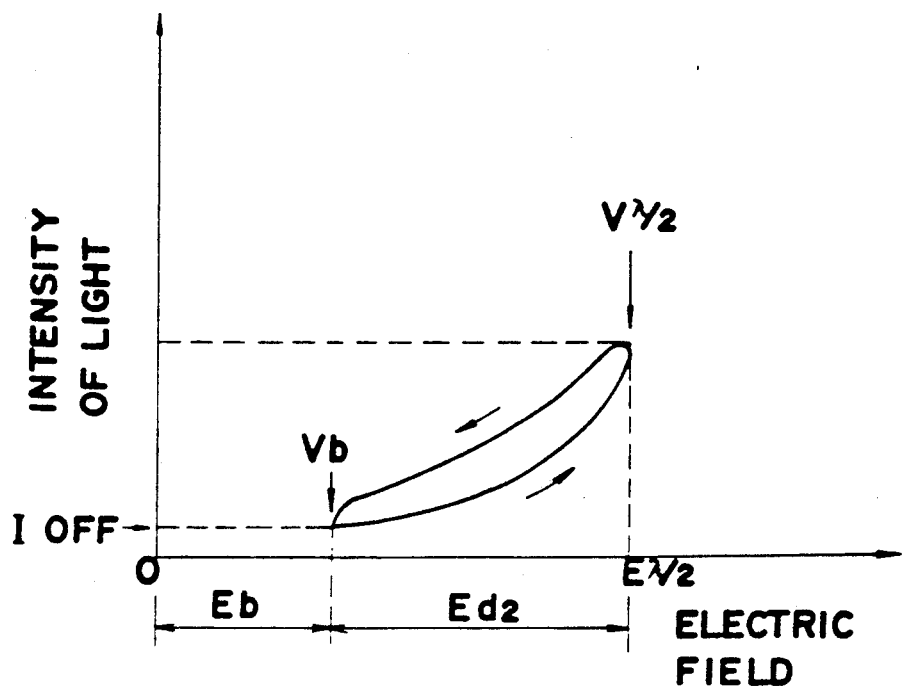
FIG. 16 is a characteristics diagram showing variations in the intensity of transmitted light when the light shutter of FIG. 3 is subjected to an electric field, followed by discharging.
Figure 17:
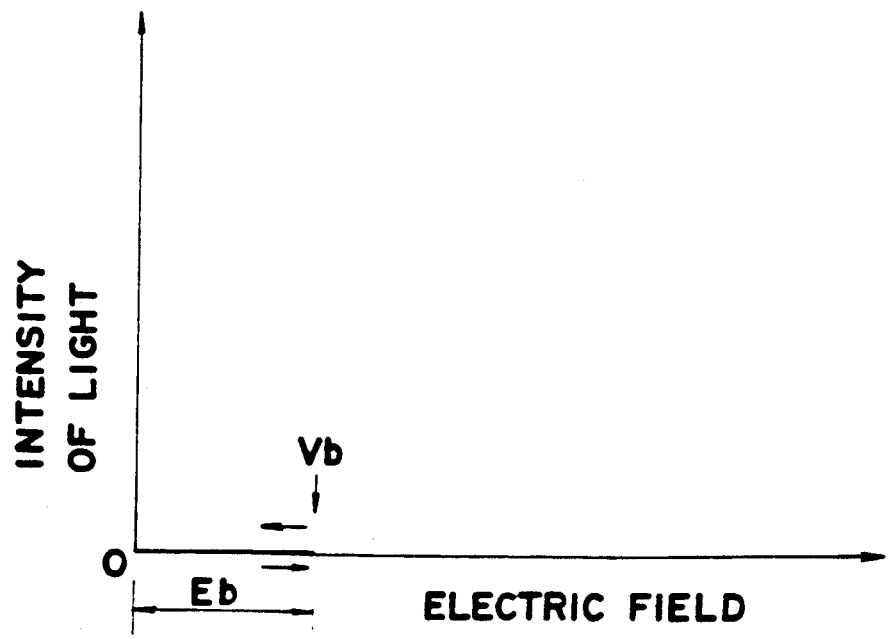
FIG. 17 is a characteristics diagram showing variations in the intensity of transmitted light when a negative bias voltage only is applied to one of the electrodes of the light shutter of FIG. 3, followed by discharging.

First, the principle of the second embodiment will be described. FIG. 15 shows variations in the intensity of light transmitted through the same light shutter as shown in FIG. 1 when the shutter is subjected to an electric field with one electrode grounded and with a voltage applied to the other electrode as in the case of FIG. 1, and also when the charge is released from the shutter. FIG. 15 reveals that the variations in the light intensity involve hysteresis characteristics. During the process wherein an electric field $E\lambda/2$ is set up as the applied voltage increases to the half-wave voltage $V\lambda/2$, little or no transmitted light is available until an electric field E1 is set up with a voltage V1, whereas during the discharging process, there is some transmitted light present in the electric field E1 due to the voltage V1. Accordingly, the light shutter was checked for variations in the intensity of transmitted light by applying a negative bias voltage $-Vb$ ($\leq -V1$) to one electrode at all times and a drive voltage Vd2 ($=V\lambda/2-Vb$) to the other electrode to set up an electric field as in the case of FIG. 3, and also by removing the charge from the shutter. Consequently, it was found that when bias voltage Vb only was applied to one electrode of the shutter, followed by discharging, there was substantially no transmitted light as shown in FIG. 17. However, when the bias voltage Vb was applied to one electrode and the drive voltage Vd2 to the other electrode, the light intensity exhibited hysteresis characteristics as seen in FIG. 16, such that even after the charge due to the drive voltage Vd2 was discharged, there was leakage of light $I_{OFF}$ under an electric field Eb due to the bias voltage Vb.

With the second embodiment, therefore, the light shutter is driven by applying voltages different in polarity to the electrodes of the shutter, and the charge accumulated in the shutter by the application of the voltages is entirely discharged.

Figure 18:
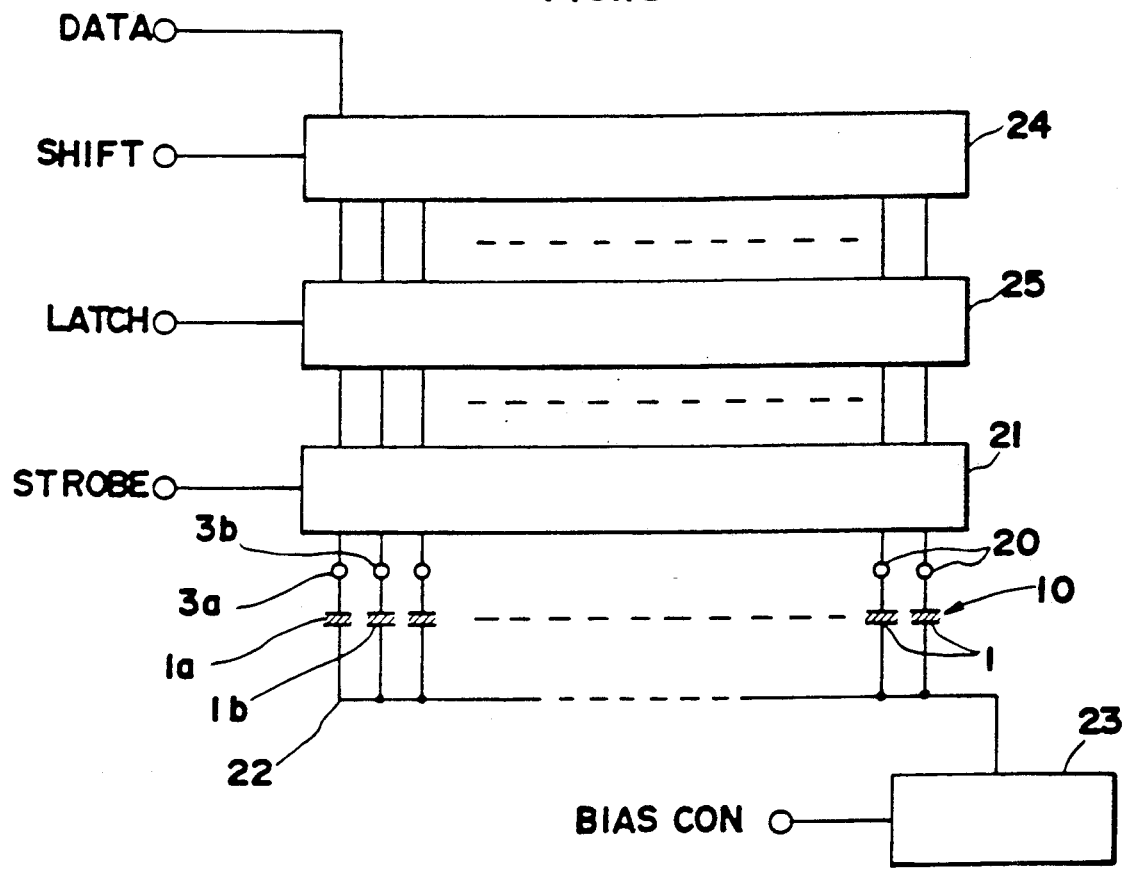
FIG. 18 is a circuit diagram showing a drive device according to a second embodiment of the invention.

FIG. 18 is a circuit diagram showing the second embodiment, in which the light shutters 1 of a light shutter array 10 are provided with individual electrodes 20 for the application of a drive voltage Vd2. These individual electrodes 20 are connected individually to a shutter drive circuit 21. For the application of a negative bias voltage $-Vb$, the light shutters 1 have an electrically common electrode 22 which is connected to a bias drive circuit 23.

A suitable light shutter 1 included in the array 10 is driven by the circuit of FIG. 18 based on data. As seen in the timing chart of FIG. 19, the data is fed to a shift register 24 and latched in a latching circuit 25. A strobing signal thereafter causes the shutter drive circuit 21 to apply a pulse of drive voltage Vd2 to the individual electrode 20 of the light shutter 1. In synchronism with the pulse of drive voltage Vd2, a pulse of negative bias voltage $-Vb$ is applied to the common electrode 22 by the bias drive circuit 23. After the suitable shutter 1 has been driven in this way, the charge accumulated in the shutter 1 with the drive voltage Vd2 and the charge with the bias voltage $-Vb$ applied to the common electrode 22 are discharged at the same time.

Figure 19:
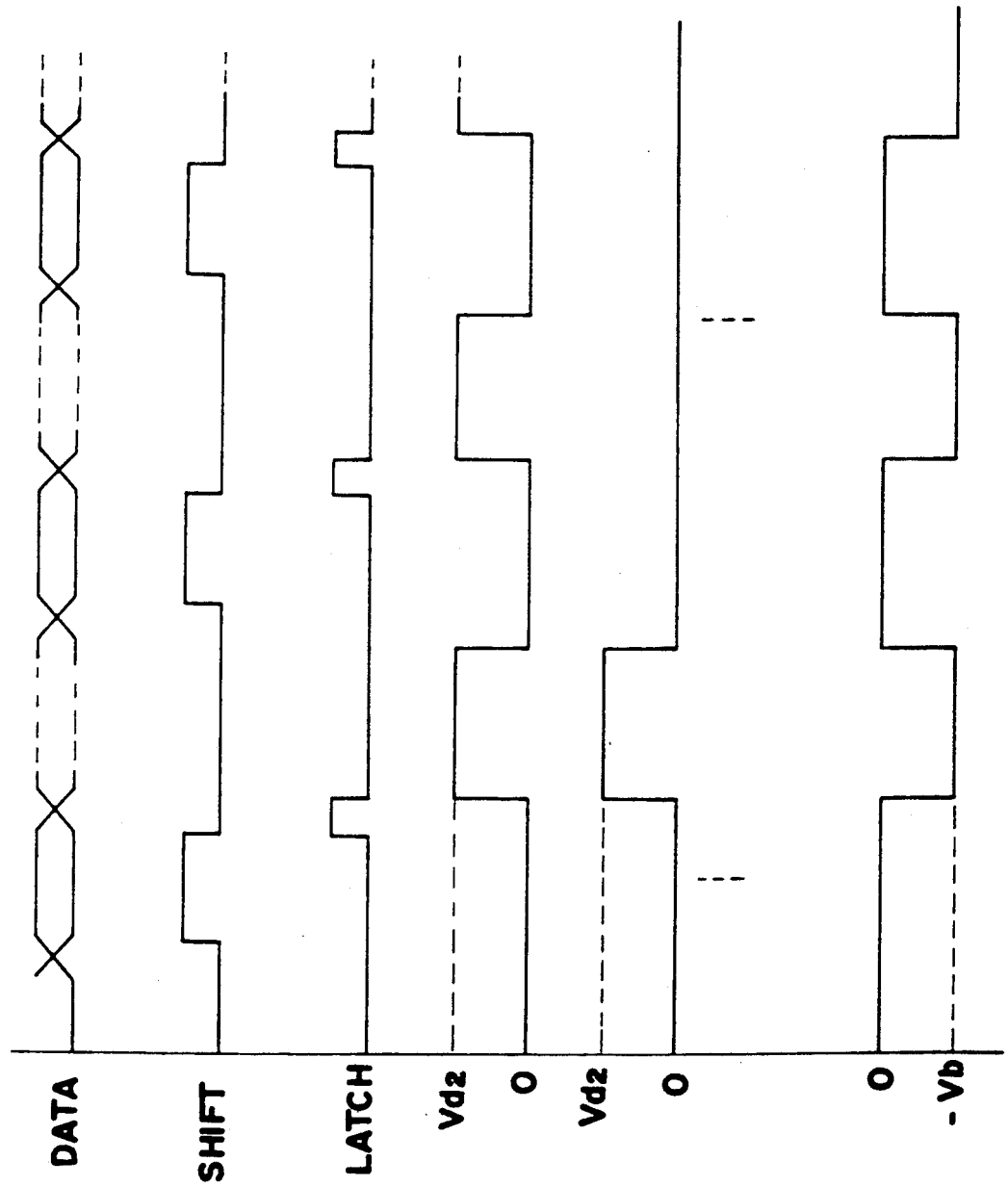
FIG. 19 is a timing chart for the operation of the drive device of FIG. 18.

The timing chart of FIG. 19 shows how the first shutter element 1a and the second shutter element 1b are driven. First, a pulse of drive voltage Vd2 is applied to the individual electrodes 20a, 20b of both the first and second shutter elements 1a, 1b, and in synchronism with the pulse, a pulse of negative bias voltage $-Vb$ of the same duration as the pulse of drive voltage Vd2 is applied to the common electrode 22, causing the first and second shutter elements 1a, 1b to transmit light therethrough. Subsequently, a pulse of drive voltage Vd2 is applied to the individual electrode 20a of the first shutter element 1a without applying any pulse to the individual electrode 20b of the second shutter element 1b, and only a pulse of negative bias voltage $-Vb$ applied to the common electrode 22 is cause to act on the second shutter element 1b. Thus, light is transmitted through the first light shutter element 1a, but no light through the second light shutter element 1b.

Figure 2:
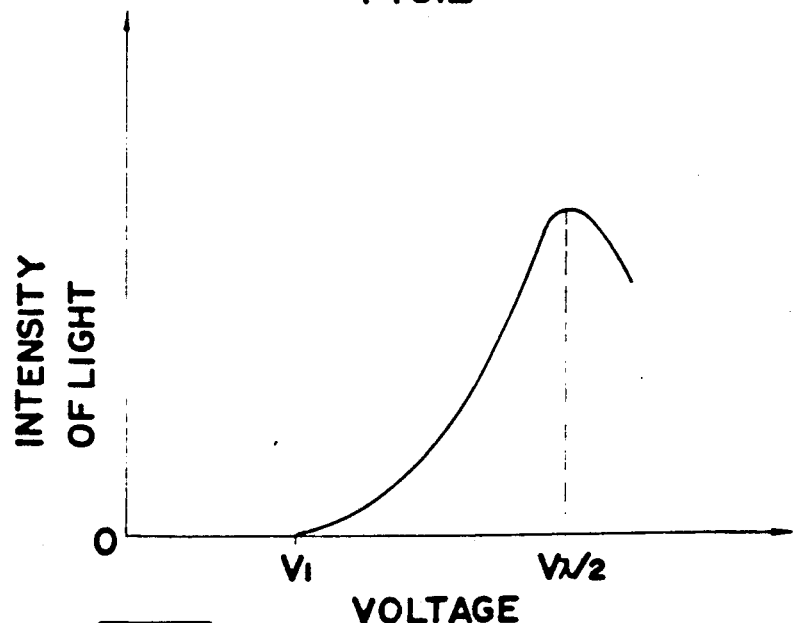
FIG. 2 is a characteristics diagram showing the relationship between the voltage applied to the light shutter and the intensity of transmitted light.

The bias voltage Vb to be applied t the common electrode 22 is made lower than the voltage V1 at which little or no transmitted light through the light shutter is available as shown in FIG. 2 so that no light leaks through the undriven light shutters 1 when the bias voltage Vb is applied to the electrode 22 common to the light shutters 1. The drive voltage Vd2 to be applied to the light shutter 1 is so determined that the sum of the bias voltage Vb and the drive voltage Vd2 is equal to the half-wave voltage $V\lambda/2$ at which transmitted light of maximum intensity is available.

Figure 20:
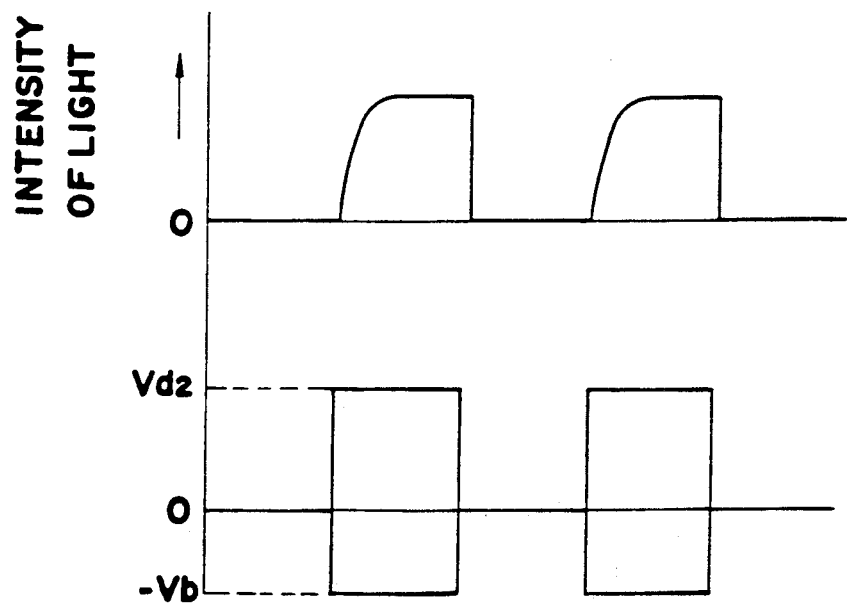
FIG. 20 is a diagram showing the relationship between the applied voltage and the intensity of transmitted light in the second embodiment.

When the pulse of drive voltage Vd2 is applied to the individual electrode 20 of the light shutter 1 for passing light therethrough, and the pulse of negative bias voltage $-Vb$ of the same duration as the pulse of drive voltage Vd2 to the common electrode 22, the light shutter is subjected to an electric field equivalent to that set up by the application of the half-wave voltage $V\lambda/2$ to afford the same quantity of transmitted light as in the latter case as seen in FIG. 20. After the charges accumulated by the drive voltage Vd2 and the bias voltage Vb have been discharged, the shutter 1 transmits no light, hence no leakage of light.

In the case where the sum of the drive voltage Vd2 and the bias voltage Vb is equal to the half-wave voltage $V\lambda/d$, and these drive and bias voltages are applied to the light shutter 1, the intensity of transmitted light is slow to rise and requires some time to reach a sufficient level as already described with reference to the first embodiment.

Figure 21:
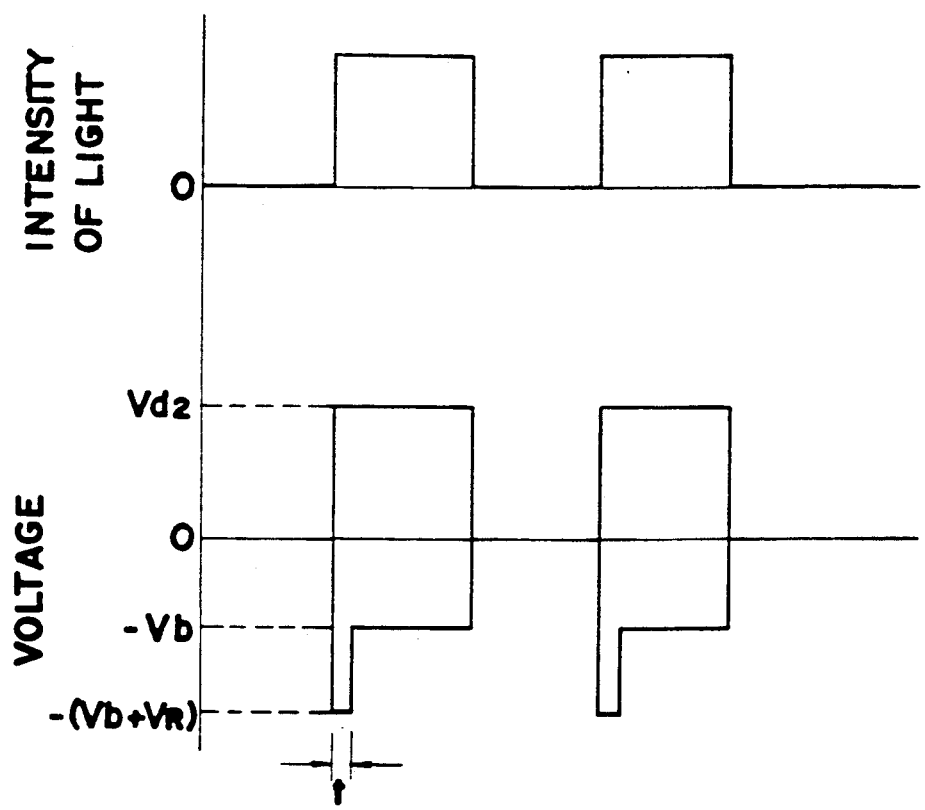
FIG. 21 is a diagram showing the relationship between the applied voltage and the intensity of transmitted light in the second embodiment when the rise of the intensity of transmitted light is expedited.

Accordingly, it is desired to expedite the rise of intensity of the light through the light shutter by applying a raising negative voltage $-VR$ of short pulse duration t initially when driving the shutter as shown in FIG. 21. With reference to FIG. 21, the raising negative voltage $-VR$ of short pulse duration t is applied along with the negative bias voltage $-Vb$ in synchronism with the application of the drive voltage Vd2 only initially when driving the light shutter, whereby the intensity of light through the shutter can be raised earlier to give transmitted light of sufficient intensity within a shorter period of time than in the case of FIG. 20.

Figure 22:
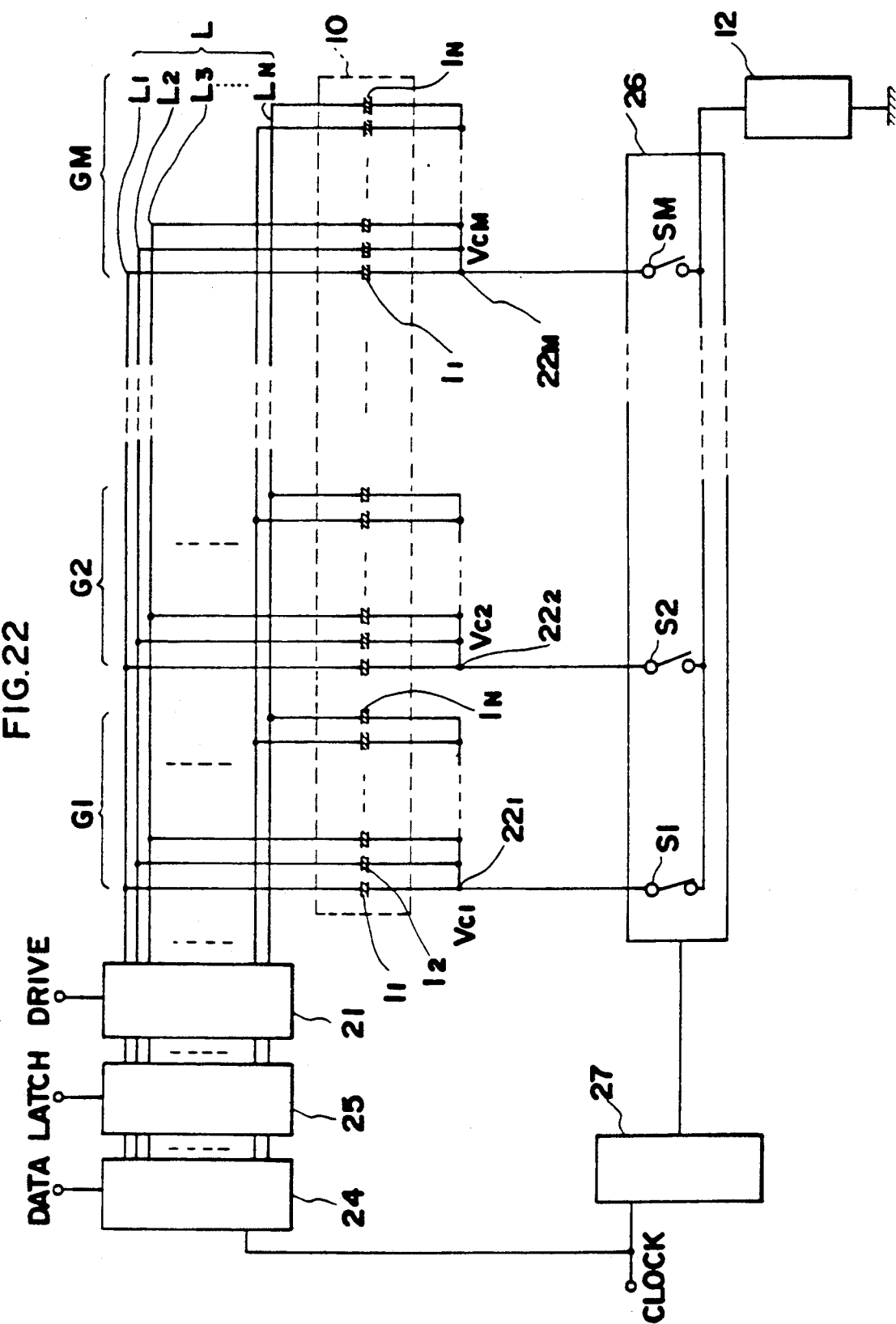
FIG. 22 is a circuit diagram of the second embodiment as adapted to drive a light shutter array from block to block.

Next, a description will be given of the case wherein a light shutter array 10 comprising a multiplicity of light shutters 1 aligned is divided into a plurality of blocks G and is driven from block to block as seen in FIG. 22.

With reference to the circuit diagram of FIG. 22, each block G of the array 10 has N light shutters $1_1 1_N$, and M such blocks $G_1$ to $G_M$ are provided. The light shutters 1 are M × N in total number.

For the application of a drive voltage Vd2, N electrodes 20 are individually provided for the N light shutters $1_1$ to $1_N$ in each of the blocks $G_1$ to $G_M$ and are connected to N signal lines $L_1$ to $L_N$ in corresponding relation. On the other hand, an electrode 22 to which a negative bias voltage $-Vb$ is applied is formed for each block G electrically in common for the shutters 1 therein. The common electrodes $22_1$ to $22_M$ for the blocks $G_1$ to $G_M$ are connected to analog switches $S_1$ to $S_M$, respectively, which are included in a multiplexer 26.

To drive one block of the light shutter array 10, printing data is sent to a shift register 24 and then latched in a latching circuit 25, and the shutter drive circuit 21 thereafter applies the drive voltage Vd2 to the individual electrode 20 of the shutter 1 in the block through the N signal line L. On the other hand, the analog switches $S_1$ to $S_M$ within the multiplexer 26 which are connected to the respective common electrodes $22_1$ to $22_M$ of the blocks $G_1$ to $G_m$ are so adapted that a suitable analog switch S only is actuated by a multiplexer control circuit 27. In synchronism with the pulse of drive voltage Vd2, a pulse of negative bias voltage $-Vb$ is applied by a bias drive circuit 23 to the common electrode 22 of the specified block G for which the analog switch S is thus actuated, whereby the light shutter 1 in the block G is driven.

Subsequently, in timed relation with the reduction of the drive voltage Vd2 to zero, the voltage Vc on the common electrode 22 to which the negative bias voltage $-Vb$ is applied is nullified to zero to completely discharge the charge accumulated in the light shutter 1.

A further description will be given with reference to the case wherein the first block $G_1$ is driven. Only the analog switch $S_1$ for the first block $G_1$ is actuated as shown in FIG. 22. With reference to the timing chart of FIG. 23, the drive voltage Vd2 serving as a printing signal is applied through the signal line L to the individual electrode 20 of a suitable light shutter 1 in the first block $G_1$, and in synchronism with the application of the voltage Vd2, the negative bias voltage $-Vb$ is applied by the bias drive circuit 23 to the common electrode $22_1$ of the block $G_1$ to make the voltage Vc1 on the common electrode $22_1 -Vb$.

Consequently, an electric field due to the voltage $Vd2+Vb$ acts across the electrodes of the light shutter 1 in the block $G_1$ to which shutter the drive voltage Vd2 is applied for the shutter to transmit light therethrough. On the other hand, the negative bias voltage $-Vb$ only acts on the other light shutters 1 of the block $G_1$, so that these shutters transmit no light when the bias voltage Vb is set to a level lower than the voltage V1 at which almost no transmitted light is available as already stated. Since the analog switches $S_2$ to $S_M$ are off which have connected thereto the common electrodes $22_2$ to $22_M$ of the other blocks $G_2$ to $G_M$, no electric field acts across the electrodes of the shutters 1 in these blocks to transmit no light therethrough.

After light has been transmitted through the suitable light shutter 1 in the first block $G_1$ in this way, the voltage Vc1 on the common electrode $22_1$ is reduced to zero in timed relation with the reduction of the drive voltage Vd2 to zero to wholly discharge the charge accumulated in the shutter 1 and thereby completely turn the shutter off.

In the same manner as in the case of the first block $G_1$ described, light shutters 1 in the second, third, . . . Mth block $G_2$, $G_3$, . . . $G_M$ are driven from block to block.

According to the second embodiment described above in detail, voltages of different polarities are applied to the respective electrodes of the light shutter to set a suitable potential difference across the electrodes. In this case, the drive voltage to be applied to one of the electrodes of the light shutter can be lower than when the shutter is driven by applying voltage to only one of the electrodes. This diminishes the damage to the switching element for the on-off control of the shutter, permits use of a switching element of lower voltage resistance and serves to provide the shutter at a reduced cost, hence advantages. The low drive voltage to be applied to one of the electrodes of the light shutter eliminates the likelihood of leakage of light unlike the prior art, consequently giving images of high contrast.

Furthermore, the charges accumulated in the light shutter with the voltages applied to the respective electrodes are completely discharged, with the result that the light shutter as discharged is free of any voltage. This obviates the likelihood that light will leak through the shutter under the action of bias voltage and serves to provide images of high contrast.

Although the present invention has been fully described by way of examples with reference to the accompanying drawings, it is to be noted that various changes and modifications will be apparent to those skilled in the art. Therefore, unless otherwise such changes and modifications depart from the scope of the invention, they should be construed as being included therein.

What is claimed is:

1. A method of driving a light shutter having an electrooptical effect to polarize an incident light by setting up an electric field between electrodes of the light shutter, comprising:

a first step of applying voltages of different polarities to the respective electrodes of the light shutter when polarizing the incident light, and applying one of the voltages only to the respective electrode when not polarizing the incident light; and a second step of applying no voltage to the respective electrodes of the light shutter subsequent to the first step so as to discharge the electric charge accumulated in the light shutter;

wherein the voltages applied to the respective electrodes when polarizing the incident light in the first step set up an electric field, exceeding a half-wave electric field that polarizes said incident light by 90° according to the static characteristics of the light shutter, and wherein subsequently, said voltages set up the half-wave electric field only.

2. A driving device for a light shutter having an electrooptical effect to polarize an incident light by applying an electric field to the light shutter, comprising:

a first and second electrodes each of which is provided on the wall of the light shutter so as to oppose each other; and a control circuit connected to at least one of the first and second electrodes for applying to the light shutter an excessive electric field in addition to a half-wave electric field which is a specific one to polarize an incident light at 90° in the static characteristics of the light shutter initially when activating the light shutter, and subsequently, for applying the half-wave electric field only to the light shutter; and wherein the first electrode is connected to the control circuit, and the second electrode is grounded; and wherein the control circuit has a first terminal applied with a first voltage for setting up the excessive electric field in addition to the half-wave electric field, a second terminal applied with a second voltage for setting up the half-wave electric field only, a third terminal applied with a periodic pulse signal, a fourth terminal applied with data for turning on and off the light shutter in synchronism with the periodic pulse signal and switching means for selectively applying one of the first and second voltages to the first electrode in response to the periodic pulse signal and data.

3. A driving device as claimed in claim 2, wherein the first voltage is applied to the first electrode during the duration of the periodic pulse signal when the on-data is present, and the second voltage is applied thereto during the time period subsequent to the duration of the periodic pulse signal when the on-data is present, by means of the switching means.

4. A driving device for a light shutter having an electrooptical effect to polarize an incident light by applying an electric field to the light shutter, comprising:

a first and second electrodes each of which is provided on the wall of the light shutter so as to oppose each other; and a control circuit connected to at least one of the first and second electrodes for applying to the light shutter an excessive electric field in addition to a half-wave electric field which is a specific one to polarize an incident light at 90° in the static characteristics of the light shutter initially when activating the light shutter, and subsequently, for applying the half-wave electric field only to the light shutter; and wherein both of the first and second electrodes are connected to the control circuit; and wherein the control circuit having a first terminal applied with a first voltage for setting up the half-wave electric field, a second terminal applied with a second voltage of the polarity different from that of the first voltage for setting up the excessive electric field, a third terminal applied with a periodic pulse signal, a fourth terminal applied with data for turning on and off the light shutter in synchronism with the periodic pulse signal, and switching means for selectively applying the first and second voltages to the first and second electrodes, respectively, in response to the periodic pulse signal and data.

5. A driving device as claimed in claim 4, wherein the first and second voltages are applied to the first and second electrodes during the duration of the periodic pulse signal when the on-data is present, and the first voltage only is applied to the first electrode during the time period subsequent to the duration of the periodic pulse signal when the on-data is present, by means of the switching means.

6. A driving device for a light shutter having an electrooptical effect to polarize an incident light by applying an electric field to the light shutter, comprising:

first and second electrodes each of which is provided on the wall of the light shutter so as to oppose each other;

a first control circuit connected to the first electrode for applying a first voltage thereto;

a second control circuit connected to the second electrode for applying a second voltage of a polarity different from that of the first voltage thereto; and a third control circuit for controlling the first and second control circuits according to data for turning on and off the light shutter so that when an ON-data is present, the first and second voltages are applied to the first and second electrodes to make the light shutter turn on and a zero voltage is applied to both electrodes subsequent to the applications of the first and second voltages, when an OFF-data is present the first voltage only is applied to the first electrode to maintain the light shutter turned off;

wherein both of the first and second voltages applied to the first and second electrodes set up an electric field, exceeding a half-wave electric field that polarizes said incident light by 90° according to the static characteristics of the light shutter, when the light shutter is initially turned on to polarize the incident light, and wherein subsequently, said voltages set up the half-wave electric field.

7. A driving device for a light shutter array having a plurality of light shutter elements aligned with one another, each of the light shutter elements having an electrooptical effect to polarize an incident light by applying an electric field thereto, the device comprising:

a plurality of individual electrodes each of which is provided on the wall of the respective light shutter element;

a common electrode which is provided on the opposite walls of the respective light shutter elements electrically in common so as to oppose to the individual electrodes;

a first control circuit to which the individual electrodes are connected individually for selectively applying a first voltage thereto at a periodic timing; and a second control circuit connected to the common electrode for applying a second voltage of a polarity different from that of the first voltage thereto at the periodic timing;

wherein the first voltage is altered within the one application period so as to initially set up an electric field, exceeding a half-wave electric field that polarizes said incident light by 90° according to the static characteristics of the light shutter elements, and to subsequently set up the half-wave electric field only, while maintaining the second voltage constant, in order to make the light shutter element turn on.

8. A driving device for a light shutter array having a plurality of light shutter elements aligned with one another, each of the light shutter elements having an electrooptical effect to polarize an incident light by applying an electric field thereto, the device comprising:

a plurality of individual electrodes each of which is provided on the wall of the respective light shutter element;

a common electrode which is provided on the opposite walls of the respective light shutter elements electrically in common so as to oppose the individual electrodes;

a first control circuit to which the individual electrodes are connected individually for selectively applying a first voltage thereto at a periodic timing; and a second control circuit connected to the common electrode for applying a second voltage of a polarity different from that of the first voltage thereto at the periodic timing;

wherein the second voltage is altered within the one application period so as to initially set up an electric field, exceeding a half-wave electric field that polarizes said incident light by 90° according to the static characteristics of the light shutter elements, and to subsequently set up the half-wave electric field only, while maintaining the first voltage constant, in order to make the light shutter element turn on.

9. A driving device for a light shutter array having a multiplicity of light shutter elements aligned with one another and divided into a plurality of blocks, each of the light shutter elements being having an electrooptical effect to polarize an incident ray of light by applying an electric field thereto, the device comprising:

a multiplicity of individual electrodes each of which is provided on the wall of the respective light shutter element;

a plurality of common electrodes arranged block by block, each of which is provided on the opposite walls of the respective light shutter elements included in the respective block electrically in common so as to oppose to the individual electrodes;

a first control means, to which the individual electrodes are connected so as to be in common with the light shutter elements located in different blocks, for selectively applying a first voltage to the individual electrodes at a periodic timing, block by block; and a second control means for applying a second voltage of a polarity different from that of the first voltage to the common electrode of the block to be driven at that timing, and for switching off the electrical connection of the common electrodes of the blocks not to be driven at that timing;

wherein the first voltage is altered within the one application period so as to initially set up an electric field, exceeding a half-wave electric field that polarizes said incident light by 90° according to the static characteristics of the light shutter elements, and to subsequently set up the half-wave electric field only, while maintaining the second voltage constant; in order to make the light shutter element turn on.

10. A driving device for a light shutter array having a multiplicity of light shutter elements aligned with one another and divided into a plurality of blocks, each of the light shutter elements having an electrooptical effect to polarize an incident ray of light by applying an electric field thereto, the device comprising:

a multiplicity of individual electrodes each of which is provided on the wall of the respective light shutter element;

a plurality of common electrodes arranged block by block, each of which is provided on the opposite walls of the respective light shutter elements included in the respective block electrically in common so as to oppose the individual electrodes;

a first control means, to which the individual electrodes are connected so as to be in common with the light shutter elements located in different blocks, for selectively applying a first voltage to the individual electrodes at a periodic timing, block by block; and a second control means for applying a second voltage of a polarity different from that of the first voltage to the common electrode of the block to be driven at that timing, and for switching off the electrical connection of the common electrodes of the blocks not to be driven at that timing;

wherein the second voltage is altered within the one application period so as to initially set up an electric field, exceeding a half-wave electric field that polarizes said incident light by 90° according to the static characteristics of the light shutter elements, and to subsequently set up the half-wave electric field only, while maintaining the first voltage constant, in order to make the light shutter element turn on.

* * * * *